(12) United States Patent
Jeong et al.

(10) Patent No.: US 10,742,995 B2
(45) Date of Patent: Aug. 11, 2020

(54) RATE DISTORTION OPTIMIZATION ENCODING SYSTEM AND METHOD OF OPERATING THE SAME

(71) Applicant: SAMSUNG ELECTRONICS CO., LTD., Suwon-si, Gyeonggi-Do (KR)

(72) Inventors: Yo Won Jeong, Anyang-si (KR); Jung Yeop Yang, Seoul (KR); Young Beom Jung, Seoul (KR); Byeung Woo Jeon, Seongnam-si (KR); Sung Hyun Cha, Suwon-si (KR); Seong Jin Kang, Suwon-si (KR); Quoc Khanh Dinh, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 250 days.

(21) Appl. No.: 15/855,922

(22) Filed: Dec. 27, 2017

(65) Prior Publication Data
US 2018/0270488 A1    Sep. 20, 2018

(30) Foreign Application Priority Data

Mar. 20, 2017 (KR) .................. 10-2017-0034779

(51) Int. Cl.
*H04N 19/159* (2014.01)
*H04N 19/44* (2014.01)
(Continued)

(52) U.S. Cl.
CPC ......... *H04N 19/159* (2014.11); *H04N 19/103* (2014.11); *H04N 19/124* (2014.11);
(Continued)

(58) Field of Classification Search
None
See application file for complete search history.

(56) References Cited

U.S. PATENT DOCUMENTS 8,238,444 B2    8/2012  Huang et al.
8,326,046 B2   12/2012  Rezazadeh et al.
(Continued)

FOREIGN PATENT DOCUMENTS

JP         2016046685         4/2016

OTHER PUBLICATIONS

S. Wang, A. Rehman, K. Zeng, J. Wang and Z. Wang, "SSIM-Motivated Two-Pass VBR Coding for HEVC," in IEEE Transactions on Circuits and Systems for Video Technology,Jun. 13, 2016 (Year: 2016).*

(Continued)

*Primary Examiner* — Stuart D Bennett
(74) *Attorney, Agent, or Firm* — Volentine, Whitt & Francos, PLLC (57) ABSTRACT

An encoding system includes a prediction mode decision unit and an encoding unit. The prediction mode decision unit is configured to receive a target image and decide an optimized mode by applying rate-distortion optimization (RDO) to n (n is a natural number) modes of the target image. The encoding unit is configured to encode the target image according to the decided mode. The prediction mode decision unit includes a distortion calculation unit configured to calculate distortion by mean squared error (MSE) calculation between the target image and the n modes, a Lagrangian multiplier calculation unit configured to calculate a Lagrangian multiplier based on multi-scale structural similarity (MS-SSIM) calculation, and a bitrate calculation unit configured to calculate a bit rate of the n modes.

16 Claims, 8 Drawing Sheets

(51) Int. Cl.
  *H04N 19/124* (2014.01)
  *H04N 19/172* (2014.01)
  *H04N 19/103* (2014.01)
  *H04N 19/147* (2014.01)
  *H04N 19/176* (2014.01)
  *H04N 19/154* (2014.01)

(52) U.S. Cl.
  CPC ......... *H04N 19/147* (2014.11); *H04N 19/154* (2014.11); *H04N 19/172* (2014.11); *H04N 19/176* (2014.11); *H04N 19/44* (2014.11)

(56) References Cited

U.S. PATENT DOCUMENTS

| | | | |
|---|---|---|---|
| 8,525,883 B2 | 9/2013 | Vu et al. | |
| 8,817,884 B2* | 8/2014 | Kudana | H04N 19/147 375/240.24 |
| 9,369,703 B2 | 6/2016 | Kwon et al. | |
| 2010/0086032 A1* | 4/2010 | Chen | H04N 19/61 375/240.12 |
| 2014/0119432 A1 | 5/2014 | Wang | |
| 2014/0119454 A1 | 5/2014 | Hebel et al. | |
| 2014/0140396 A1 | 5/2014 | Wang et al. | |

OTHER PUBLICATIONS

Seunghyun Cha et al., "Perception Based Rate Distortion Optimization in HEVC," Jan. 9, 2017, International Workshop on Advanced Image technology.

Seongin Kang et al., "HEVC Mode Decision by MS-SSIM-based Rate-Distortion Optimization," Jan. 9, 2017, International Workshop on Advanced Image technology.

* cited by examiner

RATE DISTORTION OPTIMIZATION ENCODING SYSTEM AND METHOD OF OPERATING THE SAME

CROSS-REFERENCE TO RELATED APPLICATION

This application claims priority from Korean Patent Application No. 10-2017-0034779 filed on Mar. 20, 2017 in the Korean Intellectual Property Office, and all the benefits accruing therefrom under 35 U.S.C. 119, the contents of which in its entirety are herein incorporated by reference.

BACKGROUND

1. Technical Field

The present disclosure relates to an encoding system and a method of operating the same, and more particularly to an encoding system for deciding an optimized mode by performing rate-distortion optimization (RDO) and a method of operating the same.

2. Description of the Related Art

In an image compression scheme such as MPEG-1, MPEG-2, MPEG-4, H.264/MPEG-4 Advanced Video Coding (AVC) and High-Efficiency Video Coding (HEVC), one picture is divided into unit blocks to compress and encode video. After encoding the unit block in each of all available prediction modes, a prediction mode is selected according to a bitrate required for encoding the unit block and the degree of distortion between the original unit block and the encoded unit block.

In a method of selecting a prediction mode according to the degree of distortion, in order to express the degree of distortion between the original unit block and the encoded unit block, evaluation according to rate-distortion optimization (RDO), e.g., a cost function using the distortion and the bitrate of the encoded unit block, is often used.

The distortion is a value indicating the degree of distortion between the original unit block and the encoded unit block. The distortion may be obtained by calculating a peak signal-to-noise ratio (PSNR) using mean squared error (MSE). However, since the PSNR does not accurately reflect the human cognitive characteristics, the PSNR is far from a subjective image quality scale. Thus, structural similarity (SSIM) or a multi-scale structural similarity (MS-SSIM) scheme in which the SSIM is applied to the target image and the encoded image downsized several times has been proposed.

However, since the MS-SSIM applies downsampling and a low-pass filter (LPF) to the target image and the encoded image as described above, there is a problem in that the calculation load is large and it is inefficient for real-time encoding of the target image.

SUMMARY

Aspects of the present disclosure provide an encoding system capable of efficiently performing MS-S SIM-based rate-distortion optimization using a Lagrange multiplier calculated based on an MS-SSIM calculation.

Aspects of the present disclosure also provide a method of operating an encoding system capable of efficiently performing MS-S SIM-based rate-distortion optimization using a Lagrange multiplier calculated based on an MS-SSIM calculation.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

In accordance with an aspect of the present disclosure, an encoding system includes a prediction mode decision unit configured to receive a target image and decide an optimized mode by applying rate-distortion optimization (RDO) to n (n is a natural number) modes of the target image. An encoding unit encodes the target image according to the decided mode. The prediction mode decision unit includes a distortion calculation unit configured to calculate a distortion by mean squared error (MSE) calculation between the target image and the n modes, a Lagrange multiplier calculation unit configured to calculate a Lagrange multiplier based on a multi-scale structural similarity (MS-SSIM) calculation, and a bitrate calculation unit configured to calculate a bitrate of the n modes.

In accordance with another aspect of the present disclosure, a method of operating an encoding system includes providing a target image and n (n is a natural number) modes for the target image, calculating a cost function according to rate-distortion optimization for the n modes, and selecting a mode having an optimal cost function among the n modes to encode the target image. The cost function is calculated based on a distortion calculated by an MSE calculation between the target image and the n modes and a Lagrange multiplier calculated based on multi-scale structural similarity (MS-SSIM) calculation.

In accordance with another aspect of the present disclosure, an encoding system includes a mode selection circuit and an encoder. The mode selection circuit selects an encoding mode from among multiple encoding modes and includes a distortion circuit, a Lagrange-multiplier circuit, and a selection circuit. The distortion circuit calculates distortion based on a mean square-error between a target image and a mode image, wherein the mode image is generated by encoding the target image and then decoding the encoded target image a plurality of times. The Lagrange-multiplier circuit calculates a Lagrange multiplier based upon the target image, but not the mode image. The selection circuit selects the encoding mode based upon the distortion and Lagrange multiplier. And the encoder encodes the target image using the encoding mode.

BRIEF DESCRIPTION OF THE DRAWINGS

The above and other aspects and features of the present disclosure will become more apparent by describing, in detail, exemplary embodiments thereof with reference to the attached drawings, in which.

DETAILED DESCRIPTION OF THE EMBODIMENTS

Hereinafter, an encoding system and a method for operating the encoding system according to embodiments of the present disclosure will be described with reference to FIGS. 1 to 8.

The term "unit" or "module", as used herein, means, but is not limited to, a software or hardware component, such as a field programmable gate array (FPGA) or an application specific integrated circuit (ASIC), which performs certain tasks. A unit or module may advantageously be configured to reside in the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules.

Figure 1:
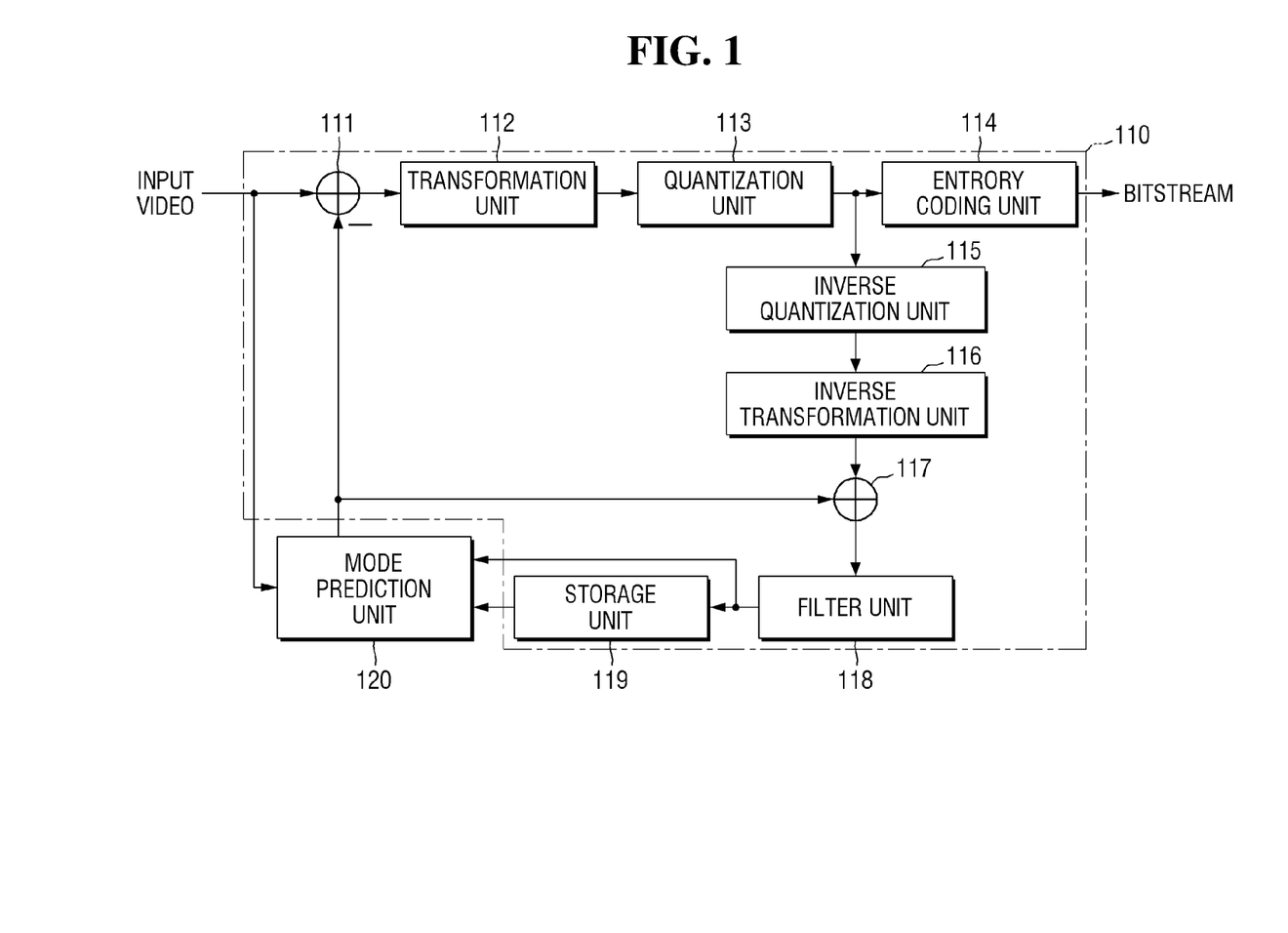
FIG. 1 is a block diagram illustrating an encoding system according to some embodiments of the present disclosure.

FIG. 1 is a block diagram illustrating an encoding system according to some embodiments of the present disclosure.

Referring to FIG. 1, an encoding system 100 according to some embodiments of the present disclosure includes an encoding unit 110 and a mode prediction unit 120.

The encoding unit 110 includes a subtractor 111, a transformation unit 112, a quantization unit 113, an entropy coding unit 114, an inverse quantization unit 115, an inverse transformation unit 116, an adder 117, a filter unit 118 and a storage unit 119. The encoding unit 110 may divide an input image from input video into unit blocks, perform, for example, intra-prediction or inter-prediction on each of the blocks, generate a prediction image, and perform conversion, quantization and entropy coding on a difference between the prediction image and the input image, thereby generating a bitstream.

Further, the encoding unit 110 may provide the mode prediction unit 120 with the prediction image required for the prediction mode decision by the mode prediction unit 120 through rate-distortion optimization (RDO). Then, if the mode prediction unit 120 performs rate-distortion optimization (RDO) and decides an optimized mode, the encoding unit 110 may encode a target image based on the optimized mode.

Specifically, the subtractor 111 generates a residual, which is a difference value between a target image block and the prediction block of the current block provided by the mode prediction unit 120. That is, intra-picture or inter-picture redundancy in the pixel area of the video is removed.

The transformation unit 112 and the quantization unit 113 transform the residual into a frequency domain and quantize the transformed residual. The entropy coding unit 114 performs variable length encoding on the quantized image data to generate a bitstream. The transformation unit 112 may perform, for example, Discrete Cosine Transform (DCT), but it is not limited thereto.

The inverse quantization unit 115 and the inverse transformation unit 116 perform inverse quantization and inverse transformation on the transformed and quantized residual data to restore the residual data. The adder 117 adds the restored residual data and the prediction data, that is, the prediction block.

The filter unit 118 filters the block outputted through the adder 117 to restore the current block. The current block restored by the filter unit 118 is stored in the storage unit 119 and used as reference data of the next block.

The mode prediction unit 120 may perform rate-distortion optimization using n modes (n is a natural number) and a target image, decide an optimized mode, and provide the optimized mode to the encoding unit 110. A more detailed explanation of the rate-distortion optimization performed by the mode predicting unit 120 will be given later.

The encoding system 100 according to an embodiment of the present disclosure may be included in a system on a chip (SOC). In other words, the encoding system 100 may operate as one of devices constituting the SOC.

Figure 2:
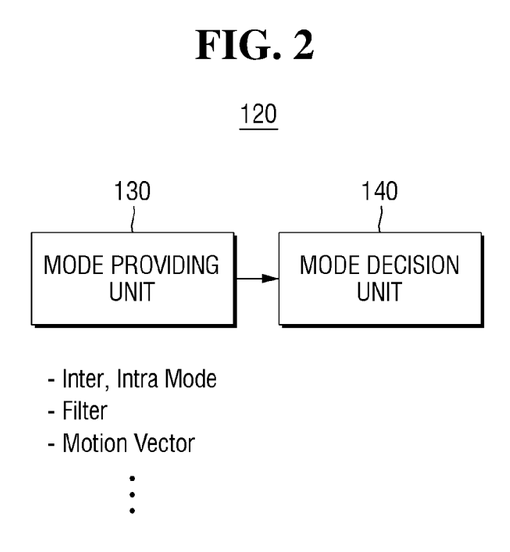
FIG. 2 is a block diagram illustrating a mode prediction unit included in the encoding system according to some embodiments of the present disclosure.

FIG. 2 is a block diagram illustrating the mode prediction unit 120 included in the encoding system 100 according to some embodiments of the present disclosure.

The mode prediction unit 120 included in the encoding system 100 according to the embodiment of the present disclosure may include a mode providing unit 130 and a mode decision unit 140.

The mode providing unit 130 may provide the n modes generated for the target image to the mode decision unit 140. The n modes provided by the mode providing unit 130 may include, for example, an intra prediction mode, an inter prediction mode, a filtered mode, or a motion vector mode.

The n modes provided by the mode providing unit 130 may be provided from the encoding unit 110 or generated by the mode providing unit 130. For example, the mode providing unit 130 may receive the intra prediction mode or inter prediction mode from the encoding unit 110, and may receive the filtered mode from the filter unit 118.

As used herein, the term "mode" may be image data obtained by encoding a target image by applying a corresponding method to the target image. For example, n modes may include image data obtained by encoding a target image by applying intra prediction with a block size of 4×4 or 16×16 pixels to the target image, but the present disclosure is not limited thereto.

The mode providing unit 130, for example, may divide the target image into k blocks having a predetermined size, and provide n modes for each of k blocks to the mode decision unit 140.

The mode decision unit 140 may calculate a cost function according to the rate-distortion optimization for each of the n modes of each of the k blocks provided from the mode providing unit 130, and decide the optimized mode. In the encoding system 100 according to an embodiment of the present disclosure, the mode decision unit 140 may perform rate-distortion optimization based on multi-scale structural similarity (MS-SSIM). The MS-SSIM-based rate-distortion optimization performed by the mode decision unit 140 will be described below.

Figure 3:
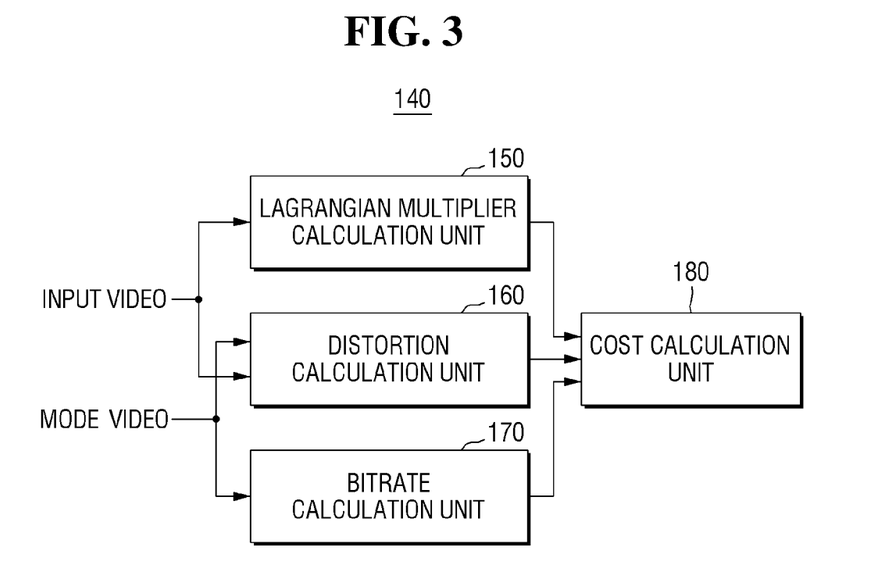
FIG. 3 is a block diagram illustrating a mode decision unit included in the encoding system according to some embodiments of the present disclosure.

FIG. 3 is a block diagram illustrating a mode decision unit included in the encoding system according to some embodiments of the present disclosure.

Referring to FIG. 3, the mode decision unit 140 may include a Lagrangian multiplier calculation unit 150, a distortion calculation unit 160, a bitrate calculation unit 170, and a cost calculation unit 180.

In general, the MS-SSIM undergoes a process of downsizing a target image, from input video, and a mode image, from mode video, of the target image generated by encoding the target image and then decoding the encoded target image a plurality of times, and calculating luminance similarity, contrast similarity, and structural similarity between the downsized target image and the downsized mode image, which can be calculated by the following Eq. 1:

$$MS-SSIM(x, y) = [l_M(x, y)]^{\alpha_M} \cdot \prod_{m=1}^{M} [c_m(x, y)]^{\beta_m} [s_m(x, y)]^{\gamma_m} \quad \text{Eq. 1}$$

where x is a target image, y is a mode image of the target image, m is an index of downsizing, M is a maximum value of the index, $l_M(x, y)$ represents luminance similarity between x and y at m=M, $c_m(x, y)$ represents contrast similarity between the target image and the mode image downsized m−1 times, $s_m(x,y)$ represents structural similarity between the target image and the mode image downsized m−1 times, and $\alpha_M$, $\beta_m$, and $\gamma_m$ are weighting constants for a multiplication operation between the respective similarity values.

Meanwhile, in the MS-SSIM, since the above parameters are computed between the 0th to (M−1)th downsized target images obtained by downsizing the target image 0 to M−1 times (M is a natural number of 2 or more) and the 0th to (M−1)th downsized mode images obtained by downsizing the mode image 0 to M−1 times, the calculation load is large and it may not be suitable for an encoding system requiring real-time encoding.

In the encoding system 100 according to some embodiments of the present disclosure, the mode decision unit 140 which performs MS-SSIM-based rate-distortion optimization may perform modified MS-SSIM calculation for fast prediction mode decision.

Specifically, the Lagrangian multiplier calculation unit 150 of the mode decision unit 140 may calculate a Lagrangian multiplier based on the MS-SSIM calculation, and the distortion calculation unit 160 may calculate a distortion by mean squared error (MSE) rather than the MS-SSIM.

Here, the mode decision unit 140 calculates the Lagrangian multiplier based on the MS-SSIM calculation, which may mean calculating the distortion derived by the MS-SSIM calculation equation, that is, the Lagrangian multiplier obtained by modifying Eq. 1 above. A detailed description thereof will be given later.

The bitrate calculation unit 170 may calculate the bitrate of each of the n modes and provide the bitrate of the n modes to the cost calculation unit 180 for calculation of the cost function.

The cost calculation unit 180 generates a cost function, for each of the n modes, by using the Lagrangian multiplier provided by the Lagrangian multiplier calculation unit 150, the distortion provided by the distortion calculation unit 160 and the bitrate provided by the bitrate calculation unit 170. Further, the cost calculation unit 180 may decide an optimized mode by determining the cost function having the lowest value among the generated cost functions and provide the optimized mode to the encoding unit 110.

The cost function $cost_k$ generated by the cost calculation unit 180 for the k-th block of each mode may be expressed by the following Eq. 2:

$$cost_k = d_k \lambda_k r_k \quad \text{Eq. 2}$$

where $d_k$ is the distortion calculated by the MSE for the k-th block, $\lambda_K$ is the Lagrangian multiplier calculated based on the MS-SSIM calculation for the k-th block, and $r_k$ is the bitrate of the k-th block.

That is, the mode decision unit 140 included in the encoding system 100 according to the embodiment of the present disclosure does not perform the entire calculation process of the MS-SSIM, and calculates the distortion calculated by the MSE and the Lagrangian multiplier modified based on the MS-SSIM, thereby reducing the load required for the MS-SSIM calculation.

Meanwhile, as shown in FIG. 3, in order to calculate the Lagrangian multiplier based on the MS-SSIM calculation, the Lagrangian multiplier calculation unit 150 may receive only the target image and may not receive the mode image. On the other hand, the bitrate calculation unit 170 for calculating the bitrate of the mode image may receive only the mode image, and the distortion calculation unit 160 for calculating the distortion by the MSE using the difference between the target image and the mode image may receive both the target image and the mode image.

Figure 4:
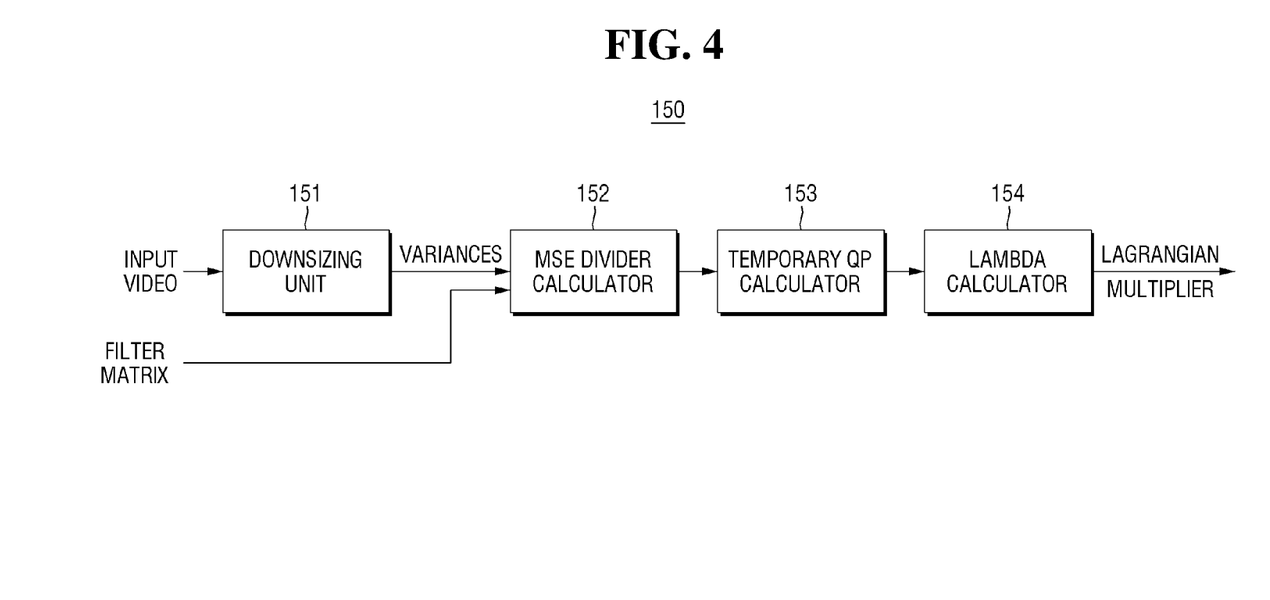
FIG. 4 is a block diagram illustrating a Lagrangian multiplier calculation unit included in the encoding system according to some embodiments of the present disclosure

FIG. 4 is a block diagram illustrating the Lagrangian multiplier calculation unit 150 included in the encoding system 100 according to some embodiments of the present disclosure.

The Lagrangian multiplier calculation unit 150 may include a downsizing unit 151, an MSE divider calculator 152, a temporary QP calculator 153 and a lambda calculator 154.

As described above, the Lagrangian multiplier calculation unit 150 receives only the target image and calculates the Lagrangian multiplier based on the MS-SSIM calculation. That is, the Lagrangian multiplier operator 150 may calculate the Lagrangian multiplier to be used in the cost function by applying the functions modified based on the MS-SSIM to the target image in order to reduce the calculation load of the MS-SSIM. In some embodiments of the present disclosure, the modified function may include $\chi$ which is an MSE divider, and a temporary quantization parameter (QP).

The downsizing unit 151 may downsize the target image and calculate the variance thereof. A specific operation of the downsizing unit 151 will be described with reference to FIG. 5.

Figure 5:
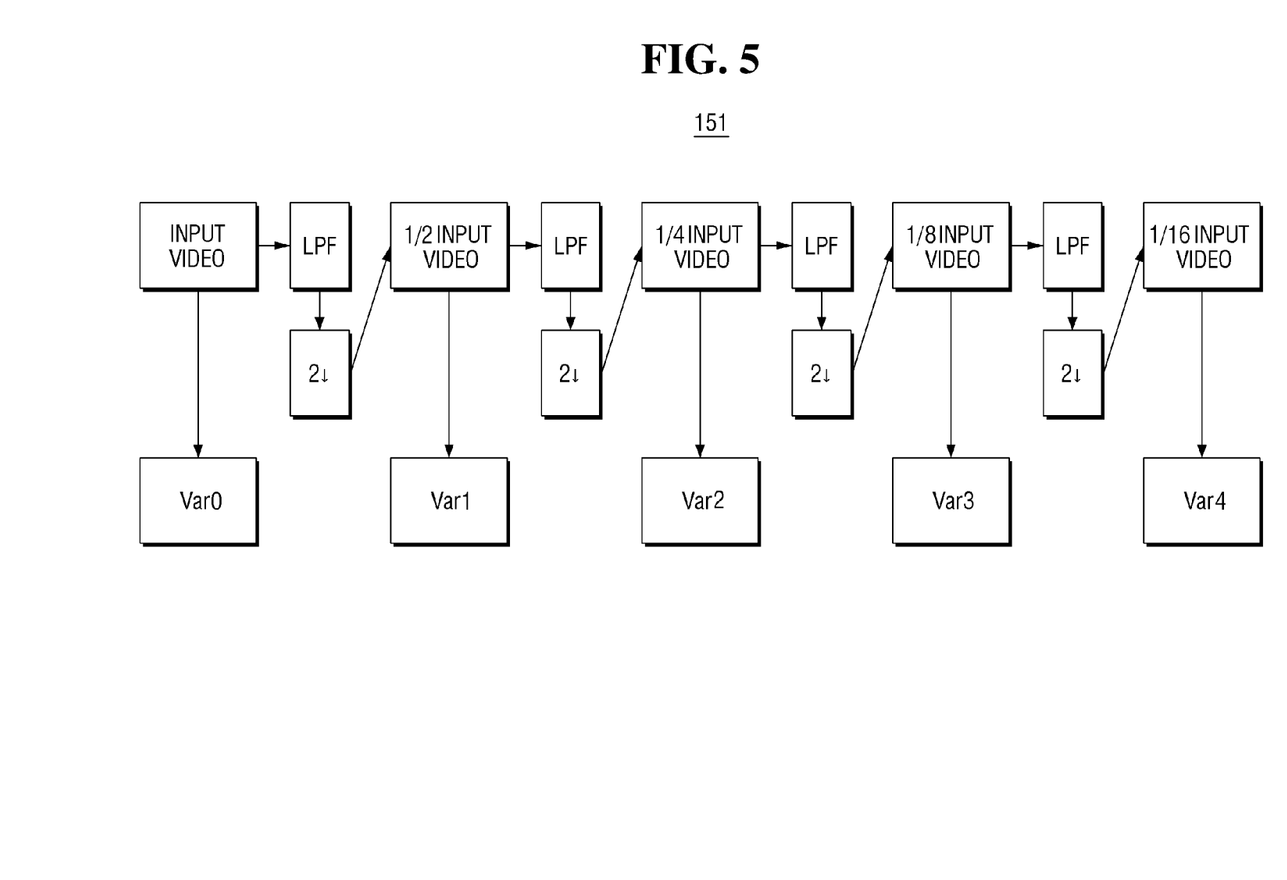
FIG. 5 is a block diagram illustrating an operation of a downsizing unit included in the encoding system according to some embodiments of the present disclosure.

FIG. 5 is a block diagram illustrating an operation of a downsizing unit included in the encoding system according to some embodiments of the present disclosure.

FIG. 5 illustrates an exemplary operation of the downsizing unit 151. First, the downsizing unit 151 calculates the variance (Var0) of the target image. In some embodiments of the present disclosure, the downsizing unit 151 may calculate the variance of the k-th block of the target image. The variance of the k-th block of the target image may be expressed as $\sigma^2_{\chi,k,1}$.

Then, the downsizing unit 151 applies a low-pass filter (LPF) to the target image, downsamples the image to which the low-pass filter is applied at a predetermined ratio, and calculates the variance (Var1) of the image downsampled at the predetermined ratio. In some embodiments of the present disclosure, the predetermined ratio may be 1/2. The variance of the image downsized once at the predetermined ratio with respect to the k-th block of the target image may be expressed as $\sigma^2_{\chi,k,2}$.

Thereafter, the process of applying the low-pass filter to the downsized image again and obtaining the variance of the image downsampled at the predetermined ratio is repeated. The variance of the image downsized m times at the predetermined ratio with respect to the k-th block of the target image may be expressed as $\sigma^2_{\chi,k,m+1}$.

The calculation of luminance similarity, contrast similarity and structural similarity of the MS-SSIM described above requires calculation of the variance of the target image and the covariance between the target image and the mode image. However, in the encoding system 100 according to the embodiment of the present disclosure, the Lagrangian multiplier calculation unit 150 receives only the target image, and the downsizing unit 151 calculates the variance of the input target image and the downsized image. Accordingly, the covariance between the target image and the mode image may not be calculated, which can reduce the complexity of the cost function calculation.

The downsizing unit 151 may provide the variance of the target image and the downsized image to the MSE divider calculator 152.

The MSE divider calculator 152 may generate an MSE divider using the variance of the target image and the downsized image provided from the downsizing unit 151. The MSE divider is a proportional expression indicating a relationship between the MSE and a distortion dMSSSIM calculated by the MS-SSIM. In some embodiments of the present disclosure, a relational expression, dMSSSIM=MSE/$\chi$, is established between the MSE and the distortion calculated by the MS-SSIM, and the MSE divider may mean $\chi$.

Meanwhile, when the distortion between the target image and the mode image is calculated by the MSE or PSNR, the distortion may decrease as the image quality scale of the mode image, for example, the correlation between the mode image and the target image, increases. On the other hand, when the distortion between the target image and the mode image is calculated by the MS-SSIM, since the MS-SSIM value increases as the correlation between the mode image and the target image increases, the distortion dMSSSIM calculated by the MS-SSIM needs to be converted so as to decrease as the correlation between the target image and the mode image increases.

The MSE divider $\chi$ may include a distortion obtained by converting the distortion of the MS-SSIM into a negative log scale (–log). In addition, the MSE divider $\chi$ may include a Taylor series approximation of the distortion calculated by the MS-SSIM. In some embodiments of the present disclosure, the MSE divider $\chi_k$ for the k-th block of the target image may be calculated by the following Eq. 3:

$$\chi_k = \left( \sum_{m=1}^{M} \frac{\beta_m c w^{m-1}}{2\sigma^2_{x,k,m} + c2} \right)^{-1} \qquad \text{Eq. 3}$$

where $\beta_m$ and c2 are constants appearing in the calculation process of the MS-SSIM, and cw may be the sum of squares of the LPF taps. The LPF taps may be received by the MSE divider calculator 152 in the form of a filter matrix.

As described above, the MS-SSIM calculation requires a repeated permutation between the contrast similarity $c_m$ and the structural similarity $s_m$. The encoding system 100 according to some embodiments of the present disclosure may use the MSE divider $\chi$ of the MS-SSIM, which has been converted into the log scale, to calculate the Lagrangian multiplier based on the MS-SSIM calculation. Thus, the repeated permutation of the MS-SSIM is converted into the series type, and the complexity of the calculation can be greatly reduced.

The MSE divider calculator 152 may provide the MSE divider calculated by the above-described process to the temporary QP calculator 153.

The temporary QP calculator 153 may calculate a temporary QP using the quantization parameter (QP) of the current block and the MSE divider $\chi$ provided by the MSE divider calculator 152. The temporary QP may be a QP for rate-distortion optimization performed by the encoding system 100 according to the embodiment of the present disclosure.

In some embodiments of the present disclosure, $tQP_k$ representing the temporary QP of the k-th block calculated by the temporary QP calculator 153 may have the form of the following Eq. 4:

$$tQP_k = QP_k + 3\log_2\left( \chi_k \exp\left( -\frac{1}{k} \sum_{j=1}^{k} \ln \chi_j \right) \right) \qquad \text{Eq. 4}$$

where $QP_k$ is a quantization parameter of the current k-th block. However, the present disclosure is not limited to having the temporary quantization parameter of the form described above. That is, the temporary QP calculated by the temporary QP calculator 153 may have another form using the MSE divider $\chi$ provided by the MSE divider calculator 152.

In some embodiments of the present disclosure, the temporary QP calculator 153 may include a separate memory for storing a table necessary for the log operation and the exponential function operation required for calculating the above-mentioned temporary QP. That is, the temporary QP calculator 153 may replace the log operation and the exponential function operation with an operation of reading from the predetermined table stored in the separate memory to calculate the temporary QP having the form of the above-mentioned Eq. 4, which can reduce the complexity of the temporary QP calculation.

The temporary QP calculator 153 may provide the temporary QP calculated by the above-described process to the lambda calculator 154.

The lambda calculator 154 may calculate the Lagrangian multiplier used in the cost function of the rate-distortion optimization calculation performed by the mode decision unit 140 using the temporary QP provided by the temporary QP calculator 153. As described above, since the temporary QP and the MSE divider necessary for generating the temporary QP are based on the MS-SSIM calculation equation, the temporary QP generated by the lambda calculator 154 may also be dependent on the MS-SSIM calculation equation.

In some embodiments of the present disclosure, the Lagrangian multiplier calculated by the lambda calculator 154 may have the form of the following Eq. 5:

$$\lambda_k = \alpha^{(QP_k-12)/3} \qquad \text{Eq. 5}$$

where $\alpha$ is a constant and may be determined in the range of 0.5 to 1.

However, the present disclosure is not limited to having the Lagrangian multiplier of the form described above. That is, the Lagrangian multiplier calculated by the lambda calculator 154 may have another form using a temporary quantization parameter tQP provided by the temporary QP calculator 153.

With the above-described process, the Lagrangian multiplier calculation unit 150 may generate the Lagrangian multiplier $\lambda_k$ based on the MS-SSIM calculation equation and provide it to the cost calculation unit 180.

The distortion calculation unit 160 may calculate the distortion between the target image and the mode image. More specifically, the distortion calculation unit 160 may calculate the distortion between the target image and the mode image by the MSE calculation.

The mode decision unit 140 included in the encoding system 100 according to the embodiment of the present disclosure performs the rate-distortion optimization based on the MS-SSIM calculation as described above. However, due to the load required for the MS-SSIM calculation, the mode decision unit 140 of the cost function calculates the distortion by calculating a difference between the target image and the mode image using the MSE calculation. Further, the mode decision unit 140 performs a calculation between the bitrate and the Lagrangian multiplier based on the MS-SSIM.

Thus, the distortion calculation unit 160 calculates the distortion using the MSE calculation without performing the distortion calculation based on the MS-SSIM calculation equation as described above. Meanwhile, the Lagrangian multiplier calculation unit 150 provides the cost calculation unit 180 with the Lagrangian multiplier calculated by modifying the distortion calculation equation by the MS-SSIM of Eq. 1 as described above. Therefore, the mode decision unit 140 according to the embodiment of the present disclosure can perform the rate-distortion optimization faster than the rate-distortion optimization using the distortion calculated by the MS-SSIM.

In some embodiments of the present disclosure, a floating-point calculation among the calculations performed by the mode decision unit 140 may be converted into an integer calculation by performing a shift operation on a target.

Then, the cost calculation unit 180 performs the calculation of Eq. 2 using the coefficients provided by the Lagrangian multiplier calculation unit 150, the distortion calculation unit 160 and the bitrate calculation unit 170. Further, the cost calculation unit 180 may select a mode having an optimal cost among the n modes and provide the selected mode to the encoding unit 110. In some embodiments of the present disclosure, the cost calculation unit 180 may select one of the n modes and provide the selected mode to the encoding unit 110, but the present disclosure is not limited thereto. The cost calculation unit 180 may select a plurality of n modes among the n modes satisfying a predetermined condition and provide them to the encoding unit 110.

The encoding unit 110 may encode the input image based on information on the n modes decided by the cost calculation unit 180.

Figure 6:
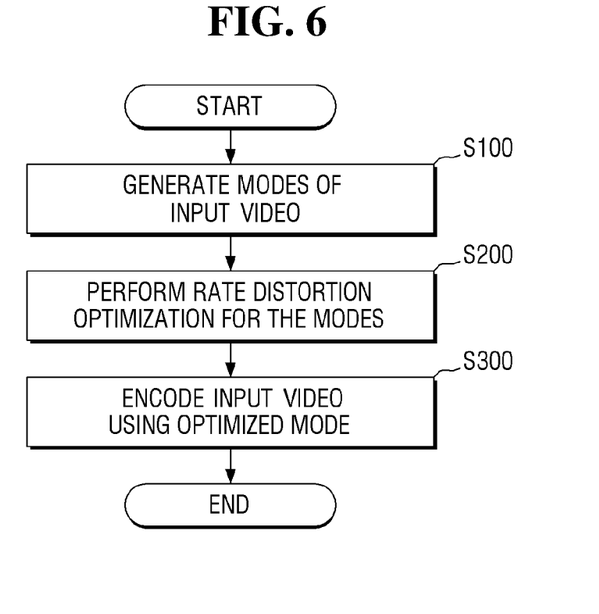
FIG. 6 is a flowchart illustrating a method of operating an encoding system according to some embodiments of the present disclosure.

FIG. 6 is a flowchart illustrating a method of operating an encoding system according to some embodiments of the present disclosure.

Referring to FIG. 6, a method of operating an encoding system according to some embodiments of the present disclosure includes generating n modes for target image data (S100), performing rate-distortion optimization on the n modes to select an optimized mode (S200), and encoding the target image using the optimized mode (S300).

Specifically, in the encoding system 100 according to the embodiment of the present disclosure, the encoding unit 110 generates n modes for the target image data and provides them to the mode prediction unit 120. The mode prediction unit 120 performs rate-distortion optimization on the n modes to select an optimized mode. The rate-distortion optimization performed by the mode prediction unit 120 may be based on the MS-SSIM scheme. More specifically, the mode prediction unit 120 performs rate-distortion optimization using the distortion of the mode and the target image calculated by the MSE, the Lagrangian multiplier based on the MS-SSIM calculation, and the bitrate of the mode. The mode prediction unit 120 provides the prediction mode decided as a result of the rate-distortion optimization to the encoding unit 110, and the encoding unit 110 encodes the target image according to the decided prediction mode.

Figure 7:
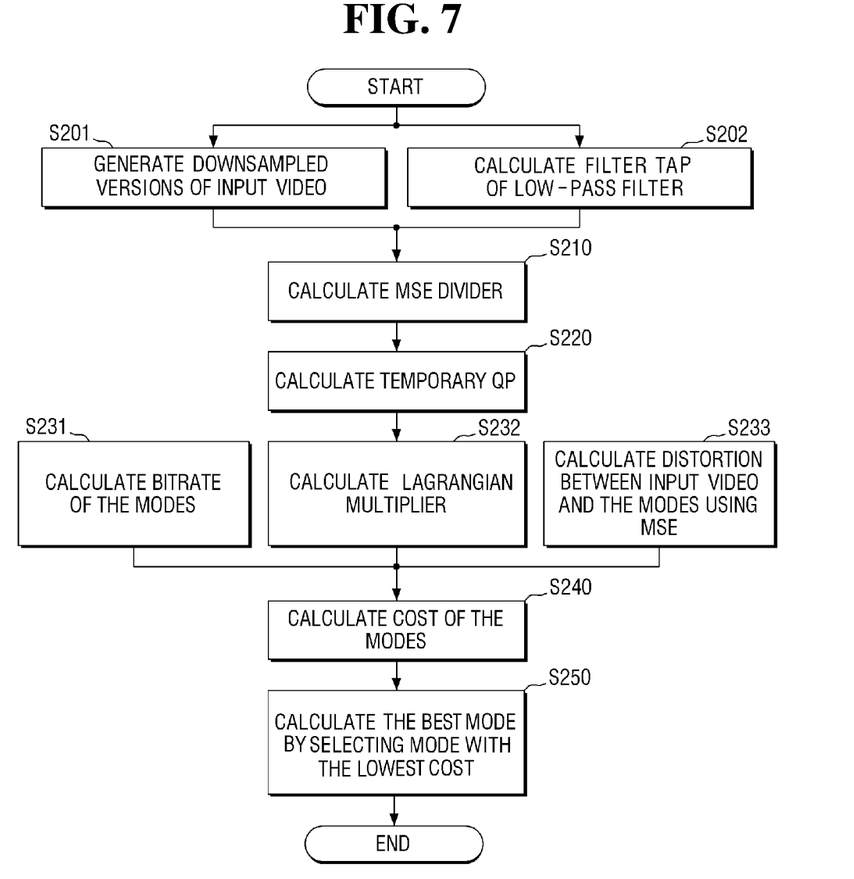
FIG. 7 is a flowchart illustrating a method of operating an encoding system according to some embodiments of the present disclosure.

FIG. 7 is a flowchart illustrating a method of operating an encoding system according to some embodiments of the present disclosure.

FIG. 7 illustrates a process of rate-distortion optimization based on the MS-SSIM scheme performed by the encoding system 100 according to some embodiments of the present disclosure.

More specifically, the rate-distortion optimization based on the MS-SSIM scheme performed by the encoding system 100 according to some embodiments of the present disclosure includes generating downsized images of the target image (S201), calculating the sum of the low-pass filter taps, i.e., the sum of the squares of the low-pass filter outputs (S202), calculating an MSE divider using the variance of the downsized images and the sum of squares of the low-pass filter taps (S210), calculating a temporary QP using the calculated MSE divider (S220), calculating a Lagrangian multiplier using the calculated temporary QP (S232), calculating the bitrate of the modes and the distortion between the target image and the modes using the MSE (S231, S233), calculating the costs of the modes (S240), and selecting an optimized mode having the lowest cost among the calculated costs (S250).

Figure 8:
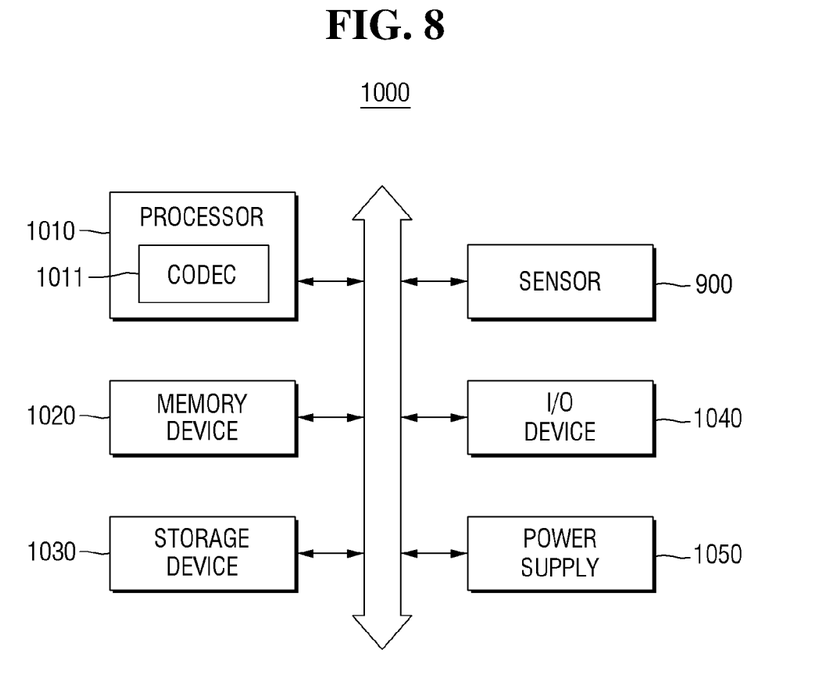
FIG. 8 is a block diagram illustrating a computing system to which an encoding system according to some embodiments of the present disclosure may be applied.

FIG. 8 is a block diagram illustrating a computing system to which an encoding system according to some embodiments of the present disclosure may be applied.

Referring to FIG. 8, a computing system 1000 may include a processor 1010, a memory device 1020, a storage device 1030, an input/output device 1040, a power supply 1050, and an imaging device (i.e., sensor) 900. Meanwhile, the computing system 1000 may further include ports capable of communicating with a video card, a sound card, a memory card, a USB device and the like, or communicating with other electronic devices.

The processor 1010 may perform specific calculations or tasks. The processor 1010 may include a video codec 1011. The video codec 1011 may include a data encoding device as described with reference to FIGS. 1 to 7. The video codec 1011 may further include a data decoding device for decoding the compressed data encoded by the data encoding device. In some embodiments of the present disclosure, the data encoding device and the data decoding device may be integrated into one device.

According to some embodiments of the present disclosure, the processor 1010 may be a micro-processor, a central processing unit (CPU) and/or the like. The processor 1010 may perform communication with the memory device 1020, the storage device 1030, the imaging device 900 and the input/output device 1040 via an address bus, a control bus, and a data bus.

According to some embodiments of the present disclosure, the processor 1010 may also be connected to an expansion bus, such as a peripheral component interconnect (PCI) bus. The memory device 1020 may store data necessary for the operation of the computing system 1000. For example, the memory device 1020 may be implemented as a DRAM, a mobile DRAM, an SRAM, a PRAM, an FRAM, an RRAM, and/or an MRAM.

The storage device 1030 may include a solid-state drive, a hard disk drive, a CD-ROM, and the like. The input/output device 1040 may include an input means such as a keyboard, a keypad or a mouse, and an output means such as a printer or a display.

The power supply 1050 may supply an operation voltage required for the operation of the computing system 1000.

The imaging device 900 may be connected to and communicate with the processor 1010 through the buses or other communication links. The imaging device 900 and the processor 1010 may be integrated together in one chip or may be integrated in different chips, respectively.

The computing system 1000 may be implemented in a variety of types of packages.

For example, at least some configurations of the computing system 1000 may be implemented using packages such as package on package (PoP), ball grid arrays (BGAs) and the like.

Meanwhile, the computing system 1000 should be interpreted as any computing system that performs a data encoding method according to some embodiments of the present disclosure. For example, the computing system 1000 may include a digital camera, a mobile phone, a personal digital assistant (PDA), a smart phone, and the like.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

The embodiments of the present disclosure have been described with reference to the attached drawings, but it may be understood by one of ordinary skill in the art that the present disclosure may be performed by one of ordinary skill in the art in other specific forms without changing the technical concept or essential features of the present disclosure. Further, the above-described embodiments are merely examples and do not limit the scope of the rights of the present disclosure.

What is claimed is:

1. An encoding system comprising:
a prediction mode decision circuit configured to receive a target image and decide an optimized mode by applying rate-distortion optimization (RDO) to n (n is a natural number) modes of the target image; and
an encoding circuit configured to encode the target image according to the decided mode, wherein
the prediction mode decision circuit comprises:
a distortion calculation circuit configured to calculate a distortion by a mean squared error (MSE) calculation between the target image and the n modes;
a Lagrange multiplier calculation circuit configured to calculate a Lagrange multiplier based on a multi-scale structural similarity (MS-SSIM) calculation; and
a bitrate calculation circuit configured to calculate a bitrate of the n modes,
wherein the Lagrange multiplier calculation circuit comprises:
a downsizing circuit configured to receive the target image to generate a downsized image, and generate a variance of the target image and a variance of the downsized image;
an MSE divider calculator configured to calculate an MSE divider by using the variance of the target image and the variance of the downsized image, the MSE divider indicating a relational expression between the distortion calculated by the MSE calculation and a distortion calculated by the MS-SSIM calculation;
a temporary quantization parameter (QP) calculator configured to generate a temporary QP using the MSE divider; and
a lambda calculator configured to calculate the Lagrange multiplier using the temporary QP.

2. The encoding system of claim 1, wherein the MSE divider is a relational expression between the distortion calculated by the MSE calculation and the distortion of the MS-SSIM calculation, which has been converted into a log scale.

3. The encoding system of claim 2, wherein the temporary QP is generated using a quantization parameter of a current block of the target image and the MSE divider.

4. The encoding system of claim 1, wherein:
the temporary QP calculator comprises a memory for storing a table having result values of logarithmic and exponential operations, and
the temporary QP calculator calculates the temporary QP using the table.

5. The encoding system of claim 1, wherein the downsizing circuit applies a low-pass filter to the target image, and downsamples the low-pass filtered target image.

6. The encoding system of claim 1, wherein the Lagrange multiplier calculation circuit receives only the target image to calculate a Lagrange multiplier based on the MS-SSIM calculation.

7. The encoding system of claim 1, wherein the prediction mode decision circuit further comprises a cost calculation circuit configured to calculate a cost function according to the rate-distortion optimization by receiving the distortion calculated by the MSE calculation, the Lagrange multiplier calculated based on the MS-SSIM calculation, and the bitrate.

8. The encoding system of claim 7, wherein the encoding circuit generates the n modes for the target image and provides the n modes to the prediction mode decision circuit.

9. A method of operating an encoding system, the method comprising:
providing a target image and n (n is a natural number) modes for the target image;
calculating a cost function according to rate-distortion optimization for the n modes; and selecting a mode having an optimal cost function among the n modes to encode the target image, wherein the calculating a cost function for the n modes comprises determining the cost function based on a distortion calculated by a mean squared error (MSE) calculation between the target image and the n modes, and a Lagrange multiplier calculated based on a multi-scale structural similarity (MS-SSIM) calculation, wherein the calculating a Lagrange multiplier based on MS-SSIM calculation comprises using a temporary quantization parameter generated based on the MS-SSIM calculation, and wherein the temporary quantization parameter is generated using a quantization parameter of a current block of the target image and an MSE divider.

10. The method of claim 9, wherein the cost function for each of the n modes is calculated by an expression:

$$cost_k = D_k + \lambda_k \times R_k,$$

where $cost_k$ is a cost function of a k-th block of the mode, $D_k$ is a distortion calculated by the MSE calculation for the k-th block of the mode, $\lambda_k$ is a Lagrange multiplier calculated based on the MS-SSIM calculation for the k-th block of the mode, and $R_k$ is a bitrate of the k-th block of the mode.

11. The method of claim 9, wherein the MSE divider is a relational expression between the distortion calculated by the MSE calculation and the distortion of the MS-SSIM calculation, which has been converted into a log scale.

12. The method of claim 9, wherein the using the MSE divider comprises not using a variance of an n-th mode of the target image.

13. An encoding system comprising:
a mode selection circuit that selects an encoding mode from among multiple encoding modes, wherein the mode selection circuit comprises:
a distortion circuit that calculates distortion based on a mean square-error between a target image and a mode image, wherein the mode image is generated by encoding the target image and then decoding the encoded target image a plurality of times,
a Lagrange-multiplier circuit that calculates a Lagrange multiplier based upon the target image, but not the mode image, and
a selection circuit that selects the encoding mode based upon the distortion and Lagrange multiplier; and
an encoder that encodes the target image using the encoding mode,
wherein the Lagrange-multiplier circuit calculates the Lagrange multiplier based upon a variance between the target image and the target image after being downsized multiple times by a low-pass filter.

14. The encoding system of claim 13, further comprising:
a bit-rate circuit that calculates a bit rate using the mode image, but not the target image, wherein
the selection circuit selects the encoding mode based upon the distortion, Lagrange multiplier, and the bit rate.

15. The encoding system of claim 13, wherein the Lagrange-multiplier circuit calculates the Lagrange multiplier using a Taylor Series expression comprising the variance and a mathematical representation of the low-pass filter.

16. The encoding system of claim 15, wherein the Lagrange-multiplier circuit calculates the Lagrange multiplier using an inverse logarithm of the Taylor Series expression.

* * * * *